United States Patent [19]

Ohno

[11] Patent Number: 5,357,374
[45] Date of Patent: Oct. 18, 1994

[54] ZOOM LENS SYSTEM

[75] Inventor: Kazunori Ohno, Omiya, Japan

[73] Assignee: Fuji Photo Optical Co., Ltd., Omiya, Japan

[21] Appl. No.: 59,655

[22] Filed: May 12, 1993

[30] Foreign Application Priority Data

May 18, 1992 [JP] Japan ................... 4-124628

[51] Int. Cl.$^5$ .................................. G02B 15/14
[52] U.S. Cl. ...................... 359/689; 359/691; 359/692; 359/784
[58] Field of Search ........... 359/689, 784, 791, 792, 359/691, 692

[56] References Cited

U.S. PATENT DOCUMENTS

4,733,952  3/1988  Fujioka .................. 359/689
4,824,223  4/1989  Doctor et al. ............ 359/689

Primary Examiner—Loha Ben
Assistant Examiner—Michael A. Papalas

[57] ABSTRACT

A zoom lens system consisting of three groups, wherein intervals between the groups are varied to thereby change a focal length. In this zoom lens system, the number of lenses constituting the groups is one, respectively. That is, a first group is constituted by a convex meniscus lens 11, a second group is constituted by a negative meniscus lens 12 directing a strong positive surface thereof toward an object and a third group is constituted by a negative meniscus lens 13 directing a strong convex surface thereof toward the object, whereby the number of the constituting lenses can be minimized to be three, and, because of the zoom lens system consisting of the three groups, the movement of the lens is scattered, so that the movement value of the lens for obtaining a desirable zooming ratio can be decreased.

10 Claims, 9 Drawing Sheets

FIG. 2(C) WIDE

TELESCOPE

FIG. 4(A) WIDE

FIG. 4(B) TELESCOPE

FIG. 5(A) FIG. 5(B) FIG. 5(C)

WIDE

TELESCOPE

WIDE

TELESCOPE

ZOOM LENS SYSTEM

BACKGROUND OF THE INVENTION

1. Field of the Invention

This invention relates to a zoom lens system, and more particularly to a small-sized zoom lens system consisting of three groups.

2. Background of the Invention

Recently, in the field of the compact camera, a small-sized and inexpensive zoom lens system has been demanded. Particularly, in the contents of the inexpensive factors, there are included limited number of parts, easy assembling and so forth. For this purpose, it has been designed to minimize the number of lenses constituting in the zoom lenses.

Heretofore, the conventional zoom lens systems having the smallest number of constituting lenses, there is already a zoom lens consisting of two groups and including three glass lenses. In these zoom lens systems, a first group consists of a concave lens and a convex lens, and a second group consists of a concave lens.

Now, in order to make the zoom lens systems small-sized, there is required not only the reduction of the number of parts but also the small movement values of the lenses from the wide end to the telescopic end.

In the case of the conventional zoom lens system consisting of the two groups, such a problem has been presented that the movement value of the lens during the zooming is large, so that small size of the lens cannot be satisfactorily achieved.

SUMMARY OF THE INVENTION

The present invention has been developed to eliminate the above-described disadvantages and has as its object the provision of a zoom lens system, in which the number of the constituting lens is minimized, the movement value of the lens during the zooming is made small and the lens is small-sized and inexpensive.

To achieve the above-described object, according to the present invention, the zoom lens system consisting of three groups, between which the intervals are made variable to change the focal length, are characterized in that a first group consists of a negative lens, a second group consists of a positive meniscus lens directing a convex surface thereof toward an object, and a third group consists of a negative meniscus lens or a positive meniscus lens, which directs a strong convex surface thereof toward the object.

According to the present invention, the zoom lens system consisting of the three groups is used, in which the intervals between the groups are varied, respectively, to thereby change the focal length, and the number of the lenses of each of the groups is made to be one, respectively. With this arrangement, the number of the lenses can be minimized to three, and, because the zoom lens system consisting of the three groups, the movement is scattered, and the movement value of the lens for obtaining a desirable zoom ratio can be made small as compared with the lens consisting of the two groups.

BRIEF DESCRIPTION OF THE DRAWINGS

The exact nature of this invention, as well as other objects and advantages thereof, will be apparent from consideration of the following specification relating to the accompanying drawings, in which like reference characters designate the same or similar parts throughout the figures and wherein.

DESCRIPTION OF THE PREFERRED EMBODIMENTS

Detailed description will hereunder be given of the preferred embodiments of the zoom lens system according to the present invention with reference to the accompanying drawings.

The First Embodiment

Figure 1A:
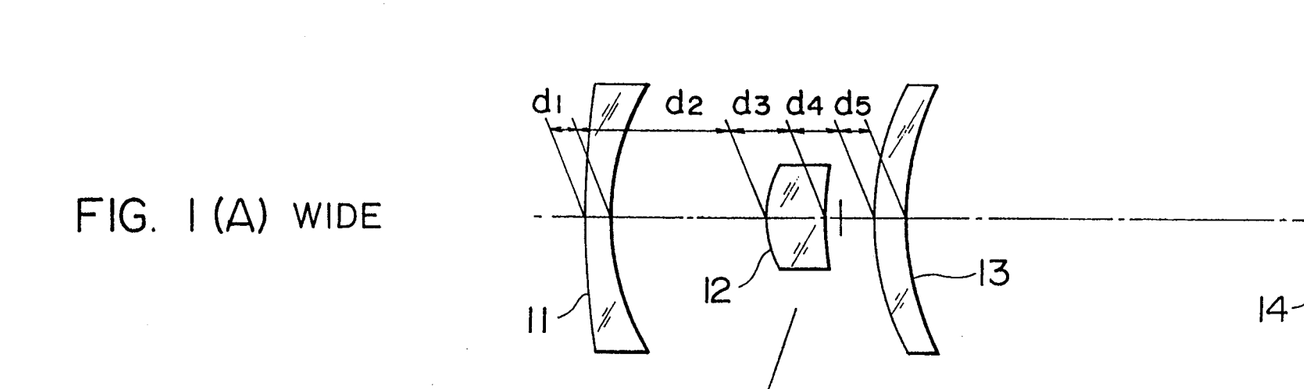
FIGS. 1(A) and 1(B) are views showing a first embodiment of the zoom lens system according to the present invention, FIG. 1(A) showing the lens during the wide and FIG. 1(B) showing the lens during the telescope.
Figure 1B:
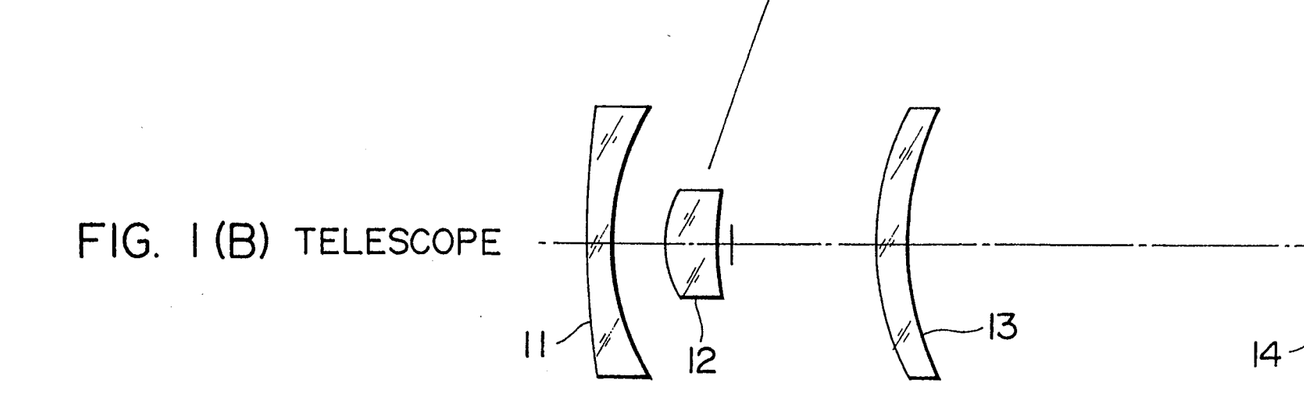

FIGS. 1(A) and 1(B) are the view showing the first embodiment of the zoom lens system according to the present invention, FIG. 1(A) showing the lens during the wide and FIG. 1(B) showing the lens during the telescope, respectively.

In FIGS. 1(A) and 1(B), designated at reference numeral 11 is a negative meniscus lens constituting the first group, 12 a positive meniscus lens constituting the second group and 13 a negative meniscus lens constituting the third group. Incidentally, denoted at 14 is a surface of image-formation, and the lenses 11, 12 and 13 are plastic lenses, respectively.

Next, designed values of the zoom lens system according to the first embodiment will be shown in the following table.

TABLE 1

| Lens | | Radius of Curvature R | | Interval between Surfaces d | | Refractive Index nd | Abbe Number |
|---|---|---|---|---|---|---|---|
| 11 | First Surface | 164.84 | *1 | | | | |
| | | | | $d_1$ | 1.50 | 1.49212 | ν d 57.6 |
| | Second Surface | 15.772 | *2 | | | | |
| | | | | $d_2$ | 9.024 ~ 1.50 | | |
| 12 | First Surface | 5.419 | *3 | | | | |
| | | | | $d_3$ | 3.50 | 1.49116 | ν d 57.8 |
| | Second Surface | 10.055 | *4 | | | | |
| | | | | $d_4$ | 3.00 ~ 10.524 | | |
| 13 | First Surface | 18.399 | | | | | |
| | | | | $d_5$ | 1.50 | 1.49116 | ν d 57.8 |
| | Second Surface | 17.640 | | | | | |

Incidentally, in Table 1, *1~*4 show aspheres. The asphere can be represented by the following equation:

$$X = \frac{h^2}{R + \sqrt{(R^2 - kh^2)}} + \sum_{i=2}^{n} a_{i-1} h^{2i} \quad (1)$$

where X is a value of change in the direction of the optical axis with respect to a height h perpendicularly intersecting the optical axis.

Furthermore, an eccentricity k and coefficients $a_1$, $a_2$ and $a_3$ will be shown in the following table.

TABLE 2

| Asphere | Eccentricity K | $a_1 (\times 10^{-3})$ | $a_2 (\times 10^{-5})$ | $a_3 (\times 10^{-7})$ |
|---|---|---|---|---|
| *1 | 310.5007 | 0.180296 | −0.471115 | 0.232951 |
| *2 | −1.99386 | 0.405448 | −0.678387 | 0.0 |
| *3 | 0.94988 | 0.226454 | 5.00294 | −23.6578 |
| *4 | 0.39940 | 1.46203 | 10.0960 | 0.0 |

Furthermore, with the zoom lens system in the first embodiment having the above-described arrangement, a composite focal length (of the whole system) f′, a back focus l′ and a total length L (a distance from the first surface of the lens 11 to the surface of image-formation 14) are shown below.

$f = 29.00 \sim 43.00$ mm $l' = 25.80 \sim 25.93$ mm $L = 44.31 \sim 44.46$ mm

Now, when a focal length of the lens 12 constituting the second group is $f_2'$, a focal length of the lens 13 constituting the third group 3 is $f_3'$ and a focal length of the whole system during the wide is $f_w'$, it is desirable that these focal lengths stay within the following formulae:

$0.5 < f_2'/f_w' < 0.8$ \quad (2)

$-0.05 < f_w'/f_3' < 0.9$ \quad (3)

That is, in the formula (2), when $f_2'/f_w' \geq 0.8$, the focal length of the lens 2 becomes longer, and the moving distance is increased, so that the camera cannot be rendered compact in size. Furthermore, the outer diameters of the lenses 11 and 13 are increased. On the other hand, when $f_2'/f_w' \leq 0.5$, the movement of the lens 12 during the zooming is cramped, so that the compensation of the aberration is difficult. And the power of the lens 11 becomes strong, so that the balance of the performance as a whole is difficult to be maintained.

Furthermore, in the formula (3), when $f_w'/f_3' \geq 0.9$, negative distortion of the lens 13 is increased, so that the powers of the lenses 11 and 12 should be decreased. Furthermore, the movement values of the groups are increased, so that the camera cannot be rendered compact in size. On the other hand, when $f_w'/f_3' \leq -0.05$, as viewed from the aberration, distortion is increased on the positive side on the telescopic side.

Incidentally, with the zoom lens system in the first embodiment, the following results are obtained:

$f_2'/f_w' = 0.6608$ $f_w'/f_3' = -0.0116$ so that the above-described formulae (2) and (3) are satisfied.

Figures 2A, 2B:
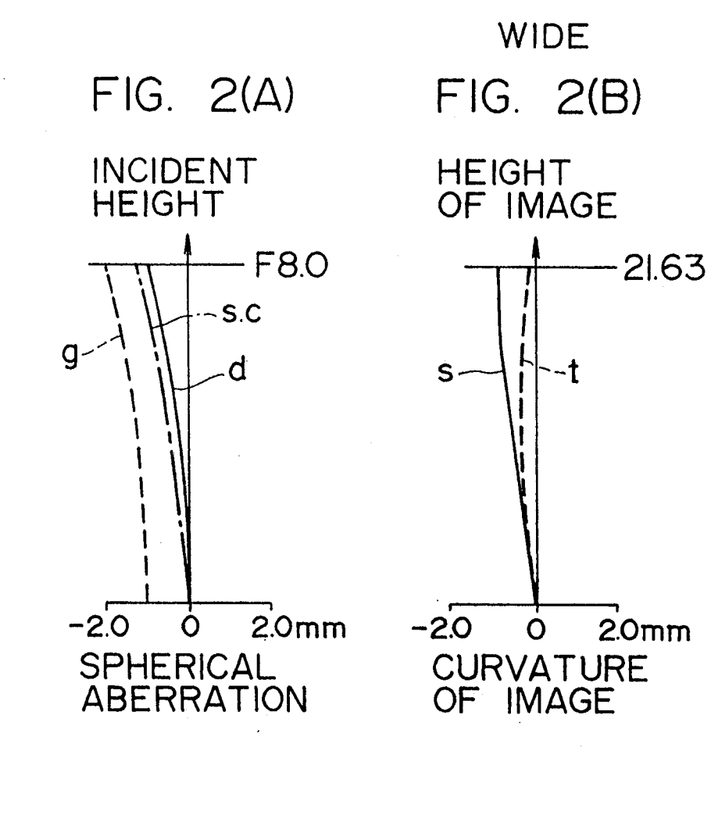
FIGS. 2(A), 2(B) and 2(C) are views showing the spherical aberration, curvature of image and distortion aberration during the wide, respectively, by the zoom lens system according to the first embodiment.
Figure 2C:
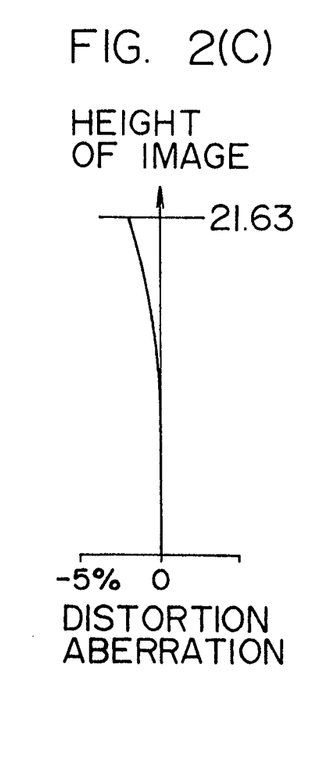
Figure 3A:
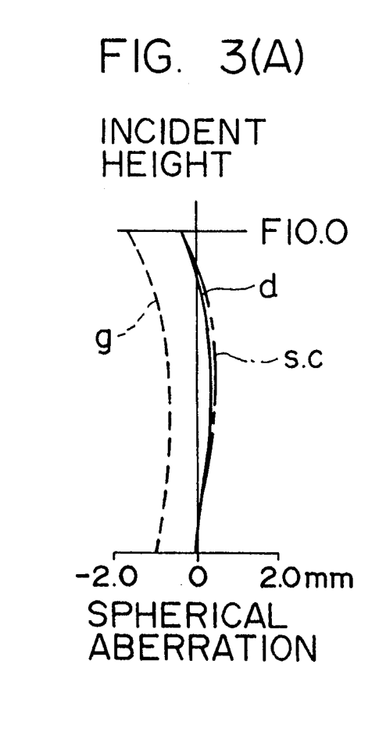
FIGS. 3(A), 3(B), 3(C) are views showing the spherical aberration, curvature of image and distortion aberration during the telescope, respectively, by the zoom lens system according to the first embodiment.
Figure 3B:
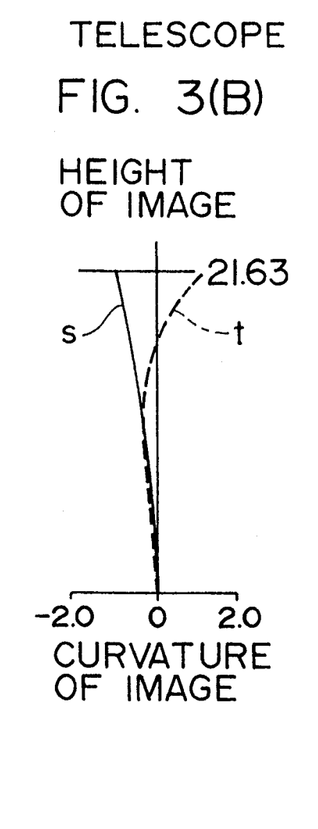
Figure 3C:
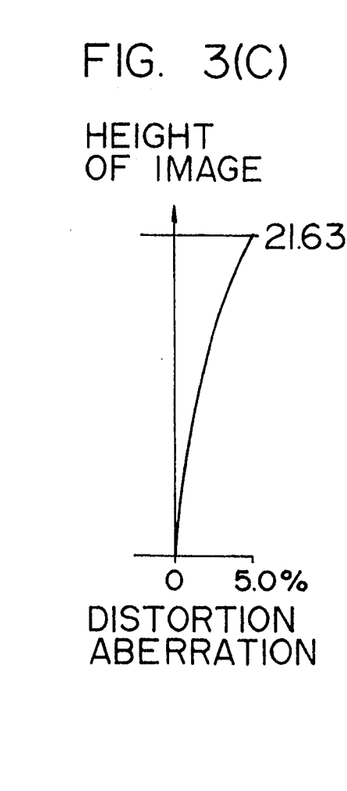

Furthermore, FIGS. 2(A), 2(B) and 2(C) show the spherical aberration, curvature of image and distortion aberration during the wide, respectively, by the zoom lens system according to the first embodiment, and FIGS.3(A), 3(B) and 3(C) show the spherical aberration, curvature of image and distortion aberration during the telescope, respectively, by the zoom lens system according to the first embodiment. Incidentally, s.c. in FIGS. 2 (A) and 3(A) are curves showing the sine condition, g is an aberration curve of a wave length 435 nm and d is an aberration curve of a wave length 578 nm. Furthermore, s in FIGS. 2(B) and 3(B) shows the curvature of image on a sagital surface, and t shows the curvature of image on a tangential surface.

The Second Embodiment

Figure 4A:
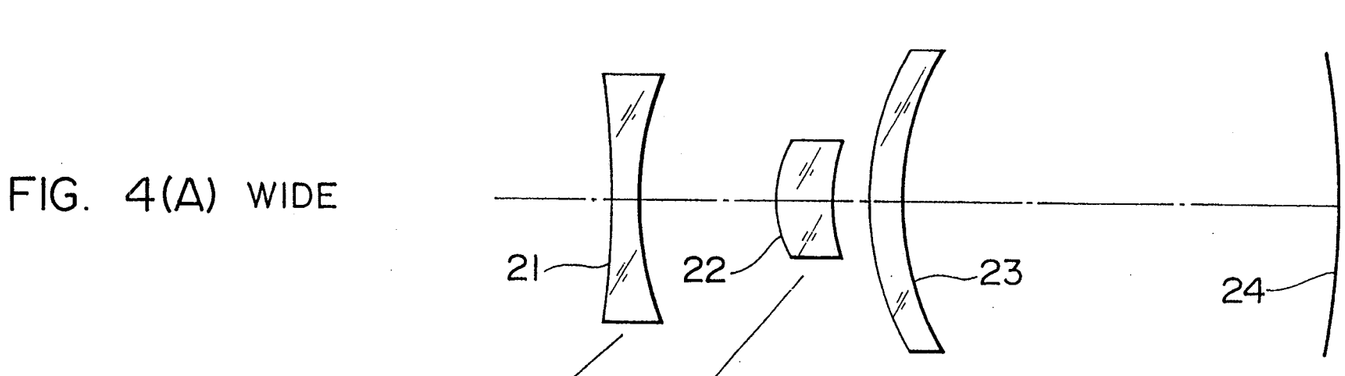
FIGS. 4(A) and 4(B) are views showing a second embodiment of the zoom lens system according to the present invention, FIG. 4(A) showing the lens during the wide and FIG. 4(B) showing the lens during the telescope, respectively.
Figure 4B:
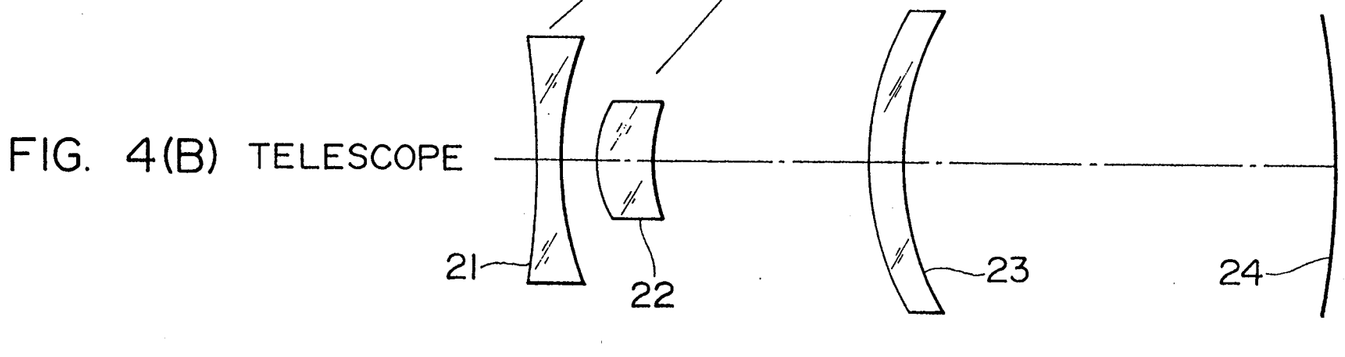

FIGS. 4(A) and 4(B) are the views showing the second embodiment of the zoom lens system according to the present invention, FIG. 4(A) showing the lens during the wide and FIG. 4(B) showing the lens during the telescope, respectively.

In FIGS. 4(A) and 4(B), designated at 21 is a double-sided concave lens constituting a first group, 22 a positive meniscus lens constituting a second group and 23 a positive meniscus lens constituting a third group. Incidentally, denoted at 24 is a surface of image-formation being curved (−170.0) and adapted to achieve a satisfactory performance. Furthermore, the lenses 21, 22 and 23 are plastic lenses, respectively.

Next, designed values of the zoom lens system in the second embodiment will be shown in the following table.

TABLE 3

| Lens | | Radius of Curvature R | | Interval between Surfaces d | | Refractive Index nd | Abbe Number |
|---|---|---|---|---|---|---|---|
| 21 | First Surface | −118.73 | *1 | | | | |
| | | | | $d_1$ | 1.50 | 1.49023 | ν d 57.6 |
| | Second Surface | 17.309 | *2 | | | | |
| | | | | $d_2$ | 7.87 ~ | | |

TABLE 3-continued

| Lens | | Radius of Curvature R | | Interval between Surfaces d | Refractive Index nd | Abbe Number |
|---|---|---|---|---|---|---|
| 22 | First Surface | 5.318 | *3 | 1.50 | | |
| | Second Surface | 9.915 | *4 | $d_3$ 3.68 | 1.49023 | $\nu$ d 57.6 |
| | | | | 1.84 | | |
| | | | | $d_4$ ~ | | |
| | | | | 13.04 | | |
| 23 | First Surface | 15.631 | *5 | | | |
| | Second Surface | 15.932 | | $d_5$ 2.0 | 1.49023 | $\nu$ d 57.6 |

Incidentally, an eccentricity K and coefficients $a_1$, $a_2$ and $a_3$ in the equation (1), which specify the aspheres (*1 ~ *5) in Table 3 will be shown in the following table.

TABLE 4

| Asphere | Eccentricity K | $a_1(\times 10^{-4})$ | $a_2(\times 10^{-7})$ | $a_3(\times 10^{-11})$ |
|---|---|---|---|---|
| *1 | 174.0964 | 1.31330 | −0.21613 | 12.000 |
| *2 | −6.64534 | 3.85144 | −0.43724 | −0.43818 |
| *3 | 1.35426 | −0.259249 | 0.00062163 | −0.000066749 |
| *4 | 2.54619 | 12.1285 | 14777.02 | 0.16323 |
| *5 | 1.00 | −0.0525263 | −0.348594 | 0.80644 |

Furthermore, with the zoom lens system in the second embodiment having the above-described arrangement, a composite focal length (of the whole system) f', a back focus l' and a total length L (a distance from the first surface of the lens 21 to the surface of image-formation 24) will be shown below:

$f' = 28.839 \sim 44.800$ mm $l' = 26.304 \sim 25.788$ mm $L = 43.189 \sim 47.500$ mm Further, with the zoom lens system in the second embodiment, the following results are obtained:

$f_2'/f_2' = 0.6422$ $f_w'/f_3' = 0.0544$ so that the above-described formulae (2) and (3) are satisfied.

Figure 5A:
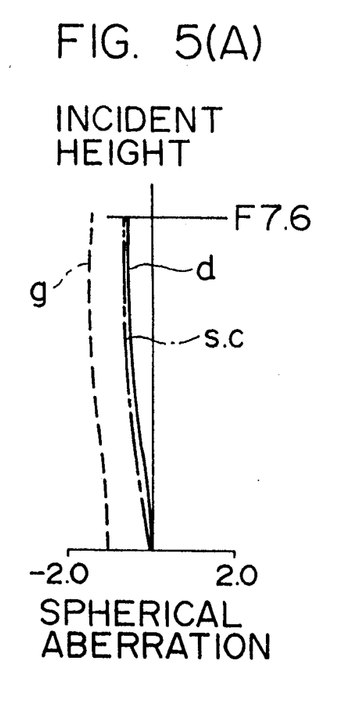
FIGS. 5(A), 5(B) and 5(C) are views showing the spherical aberration, curvature of image and distortion aberration during the wide, respectively, by the zoom lens system according to the second embodiment.
Figure 5B:
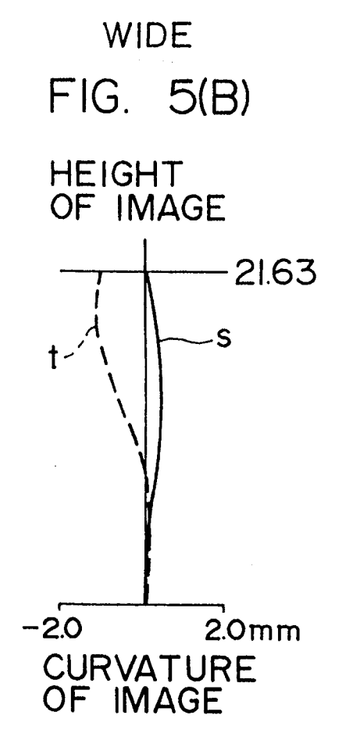
Figure 5C:
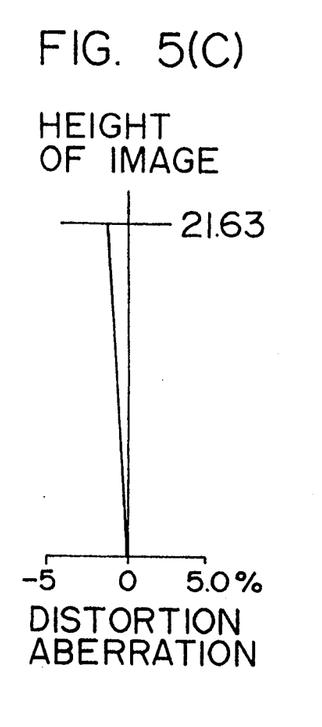
Figure 6A:
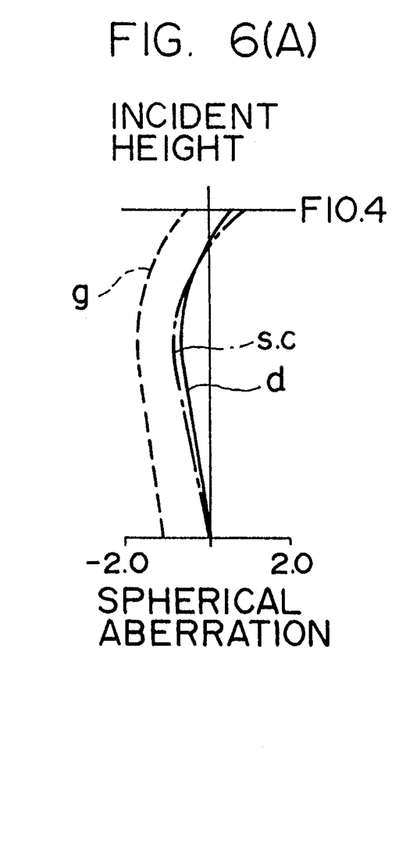
FIGS. 6(A), 6(B) and 6(C) are views showing the spherical aberration, curvature of image and distortion aberration during the telescope, respectively, by the zoom lens system according to the second embodiment.
Figure 6B:
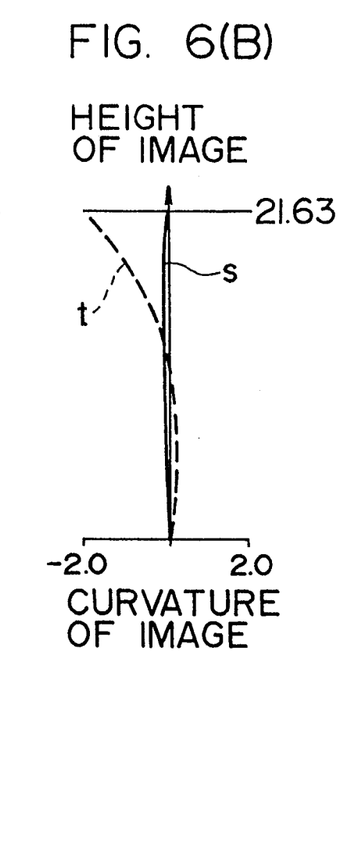
Figure 6C:
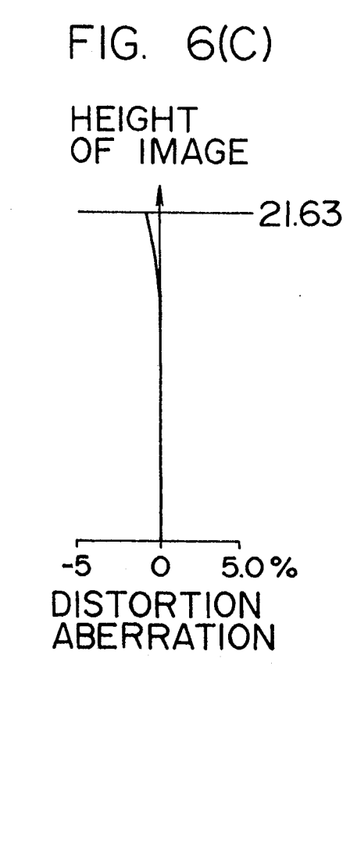

Furthermore, FIGS. 5(A), 5(B) and 5(C) show the spherical aberration, curvature of image and distortion aberration during the wide, respectively, by the zoom lens system in the second embodiment, and FIGS. 6(A), 6(B) and 6(C) show the spherical aberration, curvature of image and distortion aberration during the telescope, respectively, by the zoom lens system in the second embodiment.

The Third Embodiment

Figures 7A, 7B:
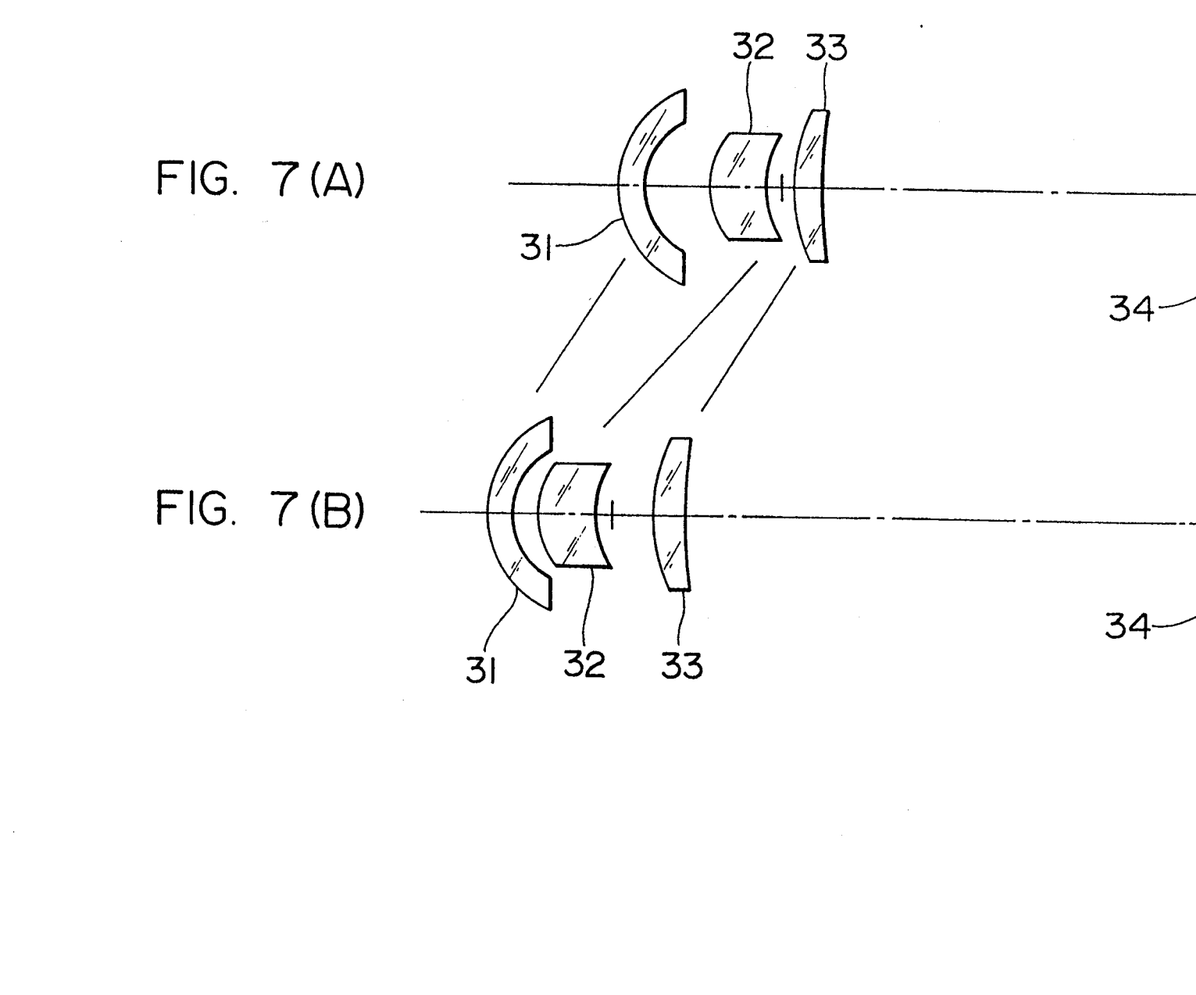
FIGS. 7(A) and 7(B) are views showing a third embodiment of the zoom lens system according to the present invention, FIG. 7(A) showing the lens during the wide and FIG. 7(B) showing the lens during the telescope, respectively.

FIGS. 7(A) and 7(B) are the views showing the third embodiment of the zoom lens system, FIG. 7(A) showing the lens during the wide and FIG. 7(B) showing the lenses during the telescope, respectively.

In FIGS. 7(A) and 7(B), designated at 31 is a negative meniscus lens constituting a first group, 32 a positive meniscus lens constituting a second group and 33 a positive meniscus lens constituting a third group. Incidentally, denoted at 34 is a surface of image-formation, and the lenses 31, 32 and 33 are plastic lenses, respectively.

Next, designed values of the zoom lens system in the third embodiment will be shown in the following table.

TABLE 5

| Lens | | Radius of Curvature R | | Interval between Surfaces d | Refractive Index nd | Abbe Number |
|---|---|---|---|---|---|---|
| 31 | First Surface | 6.155 | *1 | | | |
| | Second Surface | 3.664 | *2 | $d_1$ 1.50 | 1.53360 | $\nu$ d 40.8 |
| | | | | 4.62 | | |
| | | | | $d_2$ ~ | | |
| | | | | 1.50 | | |
| 32 | First Surface | 4.088 | *3 | | | |
| | Second Surface | 5.652 | *4 | $d_3$ 3.70 | 1.49116 | $\nu$ d 57.6 |
| | | | | 1.58 | | |
| | | | | $d_4$ ~ | | |
| | | | | 3.50 | | |
| 33 | First Surface | 11.670 | *5 | | | |
| | Second Surface | 31.048 | | $d_5$ 1.50 | 1.49116 | $\nu$ d 57.6 |

Incidentally, an eccentricity K and coefficients $a_1$, $a_2$, $a_3$ and $a_4$ in the equation (1), which specify the aspheres (*1 ~ *5) in the table 3, will be shown in the following table.

TABLE 6

| Asphere | Eccentricity K | $a_1(\times 10^{-3})$ | $a_2(\times 10^{-5})$ | $a_3(\times 10^{-6})$ | $a_4(\times 10^{-8})$ |
|---|---|---|---|---|---|
| *1 | −0.12558 | −0.71136 | −0.42622 | 0.190307 | −0.23773 |
| *2 | −0.83774 | −1.2195 | −0.405204 | −0.63101 | 0.54171 |
| *3 | −0.136149 | −0.033942 | 0.57651 | −1.3395 | 0.0 |
| *4 | 3.44900 | −0.078431 | −30.200 | 0.0 | 27.84 |
| *5 | 3.19899 | −0.14357 | −24.444 | 49.7866 | −293.64 |

Furthermore, with the zoom lens system in the third embodiment having the above-described arrangement, a composite focal length (of the whole system) f', a back focus l' and a total length L (a distance from the first surface of the lens 31 to the surface of image-formation 34) will be shown below.

$f' = 29.00 \sim 42.97$ mm $l' = 24.49 \sim 32.90$ mm $L = 37.39 \sim 44.60$ mm

Further, with the zoom lens system in the third embodiment, the following results are obtained:

$$f_2'/f_w' = 0.5829$$

$$f_w'/f_3' = 0.781$$

so that the above-described formulae (2) and (3) are satisfied.

Figure 8A:
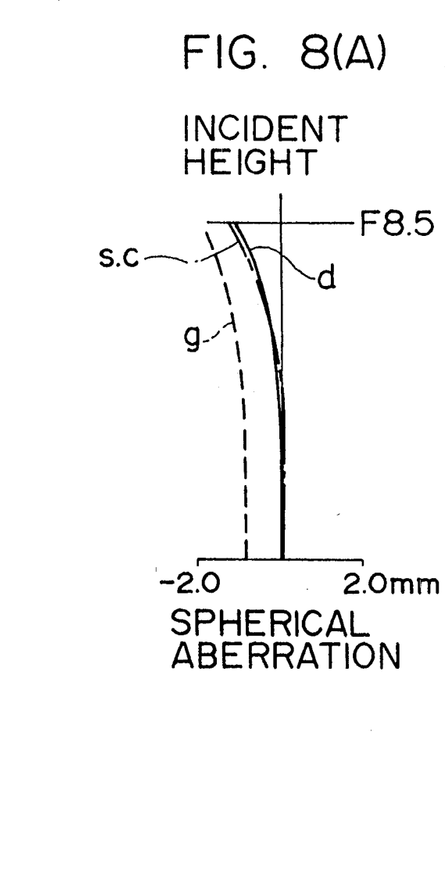
FIGS. 8(A), 8(B) and 8(C) are views showing the spherical aberration, curvature of image and distortion aberration during the wide, respectively, by the zoom lens system according to the third embodiment.
Figure 8B:
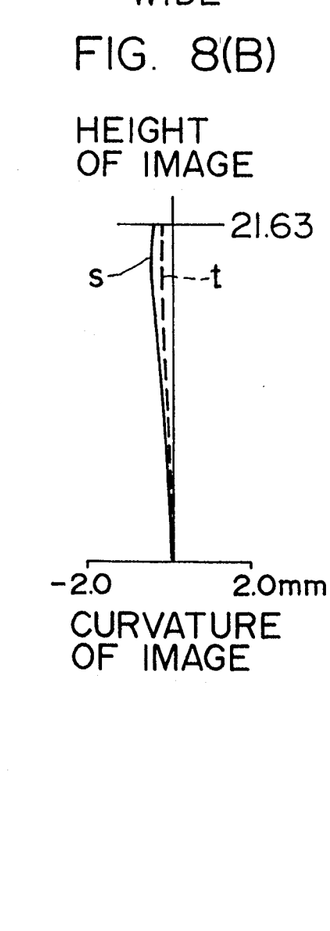
Figure 8C:
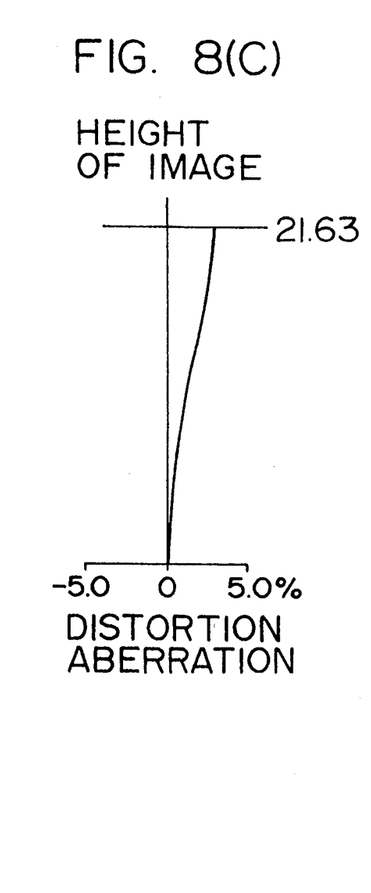
Figure 9A:
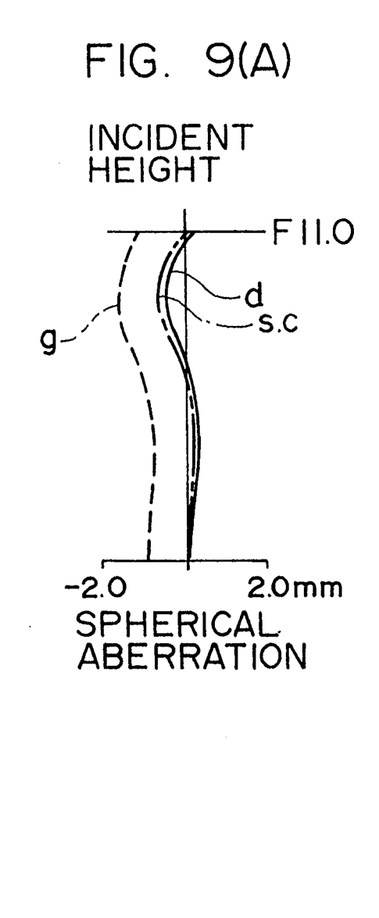
FIGS. 9(A), 9(B) and 9(C) are views showing the spherical aberration, curvature of image and distortion aberration during the telescope, respectively, by the zoom lens system according to the third embodiment.
Figure 9B:
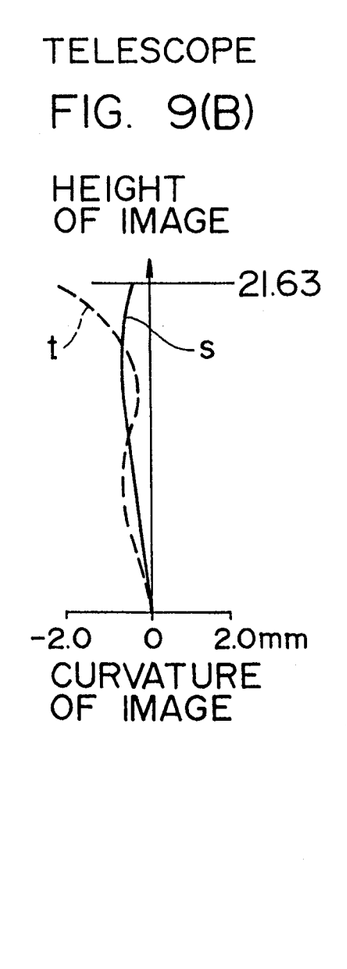
Figure 9C:
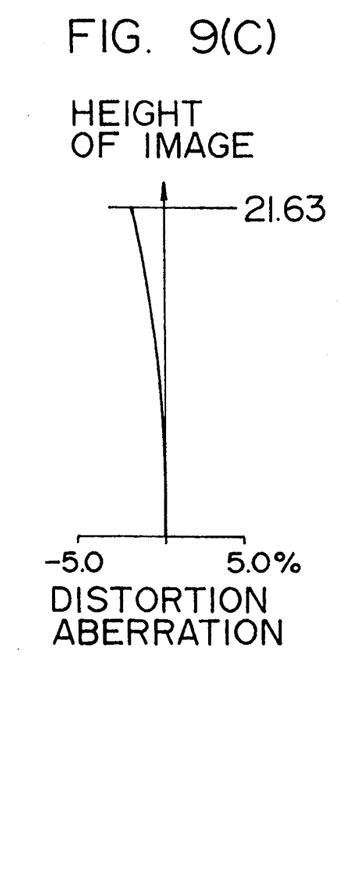

Furthermore, FIGS. 8(A), 8(B) and 8(C) show the spherical aberration, curvature of image and distortion aberration during the wide, respectively, by the zoom lens system in the third embodiment, and FIGS. 9(A), 9(B) and 9(C) show the spherical aberration, curvature of image and distortion aberration during the telescope, respectively, by the zoom lens system in the third embodiment.

Incidentally, this embodiment has been attained by use of the plastic lenses, however, the glass mold lenses may be used, in which case, improved performance can be expected.

As has been described hereinabove, the small-sized zoom lens system according to the present invention can offer such advantages that the number of the constituting lens can be minimized to three, and the zoom lens system consisting of the three groups is adopted, in which the intervals between the respective groups are varied to thereby change the focal length, whereby the movement of the lens are scattered and the movement value of the lens during the zooming can be decreased, so that the camera can be rendered compact in size and inexpensive.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A zoom lens system consisting of three groups, wherein intervals between the groups are varied to change a focal length, characterized in that:
   a first group consists of a negative lens;
   a second group consists of a positive meniscus lens directing a strong convex surface thereof toward an object; and
   a third group consists of a negative meniscus lens, which directs a strong convex surface thereof toward the object.

2. The zoom lens system as set forth in claim 1, wherein, when a focal length of said second group is $f_2'$ and a composite focal length of the whole system on the wide side is $f_w'$, the following formula is to be satisfied:

$$0.5 < f_2'/f_w' < 0.8.$$

3. The zoom lens system as set forth in claim 1, wherein all of said lenses have at least one surface thereof formed to provide an aspherical shape.

4. The zoom lens system as set forth in claim 1, wherein all of said lenses are formed of plastic lenses.

5. The zoom lens system as set forth in claim 1, wherein, when a focal length of said third group is $f_3'$ and a composite focal length of the whole system on the wide side is $f_w'$, the following formula is to be satisfied:

$$-0.05 < f_w'/f_3' < 0.9.$$

6. A zoom lens system consisting of three groups, wherein intervals between the groups are varied to change a focal length, characterized in that:
   a first group consists of a negative lens;
   a second group consists of a positive meniscus lens directing a strong convex surface thereof toward an object; and
   a third group consists of a positive meniscus lens, which directs a strong convex surface thereof toward the object.

7. The zoom lens system as set forth in claim 6, wherein, when a focal length of said second group is $f_2'$ and a composite focal length of the whole system on the wide side is $f_w'$, the following formula is to be satisfied:

$$0.5 < f_2'/f_w' < 0.8.$$

8. The zoom lens system as set forth in claim 6, wherein all of said lenses have at least one surface thereof formed to provide an aspherical shape.

9. The zoom lens system as set forth in claim 6, wherein all of said lenses are formed of plastic lenses.

10. The zoom lens system as set forth in claim 6, wherein, when a focal length of said third group is $f_3'$ and a composite focal length of the whole system on the wide side is $f_w'$, the following formula is to be satisfied:

$$-0.05 < f_w'/f_3' < 0.9.$$

* * * * *